US012455671B2

(12) United States Patent
Kuscher et al.

(10) Patent No.: US 12,455,671 B2
(45) Date of Patent: *Oct. 28, 2025

(54) MULTI-SPATIAL OVERVIEW MODE

(71) Applicant: Google LLC, Mountain View, CA (US)

(72) Inventors: Alexander Friedrich Kuscher, San Francisco, CA (US); Jennifer Shien-Ming Chen, San Francisco, CA (US); Sebastien Vincent Gabriel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 17/348,609

(22) Filed: Jun. 15, 2021

(65) Prior Publication Data

US 2021/0311597 A1 Oct. 7, 2021

Related U.S. Application Data

(63) Continuation of application No. 15/336,661, filed on Oct. 27, 2016, now Pat. No. 11,068,125.

(51) Int. Cl.
G06F 3/0482 (2013.01)
G06F 3/04817 (2022.01)
(Continued)

(52) U.S. Cl.
CPC ........ *G06F 3/0482* (2013.01); *G06F 3/04817* (2013.01); *G06F 3/0483* (2013.01);
(Continued)

(58) Field of Classification Search
CPC .................................................... G06F 3/0482
(Continued)

(56) References Cited

U.S. PATENT DOCUMENTS

2006/0059460 A1* 3/2006 Phillips ...................... G06F 8/70
717/109
2007/0128899 A1* 6/2007 Mayer ................... G06F 9/4406
439/152
(Continued)

FOREIGN PATENT DOCUMENTS

WO 2004063917 A2 7/2004

OTHER PUBLICATIONS

International Search Report and Written Opinion from PCT/US2017/049753, mailed Oct. 26, 2017, 10 pp.

(Continued)

*Primary Examiner* — Ruay Ho
(74) *Attorney, Agent, or Firm* — Shumaker & Sieffert, P.A.

(57) ABSTRACT

On a computing device, an overview mode is provided to present overview windows of all applications currently running on the computing device. When one or more applications are running in a windowed mode, a first overview window is generated for each of the one or more applications running in the windowed mode; when one or more applications are running in a full-screen mode, a second overview window is generated for each of the one or more applications running in the full-screen mode. The one or more first overview windows in the first space can be arranged in one or more rows in a first overview space, and the one or more second overview windows in the second space in a stack in a second overview space. The arranged overview windows may then be displayed in the overview mode of the computing device.

20 Claims, 13 Drawing Sheets

(51) Int. Cl.
*G06F 3/0483* (2013.01)
*G06F 3/04845* (2022.01)
*G06F 3/0485* (2022.01)
*G06F 9/44* (2018.01)
*G06F 9/451* (2018.01)

(52) U.S. Cl.
CPC ........ *G06F 3/04845* (2013.01); *G06F 3/0485* (2013.01); *G06F 9/44* (2013.01); *G06F 9/451* (2018.02)

(58) Field of Classification Search
USPC .......................... 715/728, 788, 835; 717/109
See application file for complete search history.

(56) References Cited

U.S. PATENT DOCUMENTS

| | | |
|---|---|---|
| 2010/0313156 A1 | 12/2010 | Louch et al. |
| 2015/0052473 A1 | 2/2015 | Kuscher et al. |
| 2016/0070423 A1 | 3/2016 | Doan et al. |
| 2016/0147388 A1* | 5/2016 | Shin ........................ G06F 3/013 715/728 |
| 2016/0148423 A1* | 5/2016 | Peng ................... G06F 3/04845 715/835 |
| 2017/0357418 A1* | 12/2017 | Dunn .................... G06F 3/0481 |
| 2018/0121028 A1 | 5/2018 | Kuscher et al. |
| 2018/0356621 A1* | 12/2018 | Ward ................... G02B 21/367 |

OTHER PUBLICATIONS

International Preliminary Report on Patentability from International Application No. PCT/US2017/049753, dated Apr. 30, 2019, 8 pp.
Prosecution History from U.S. Appl. No. 15/336,661, dated Jun. 26, 2018 through Apr. 1, 2021, 80 pp.

* cited by examiner

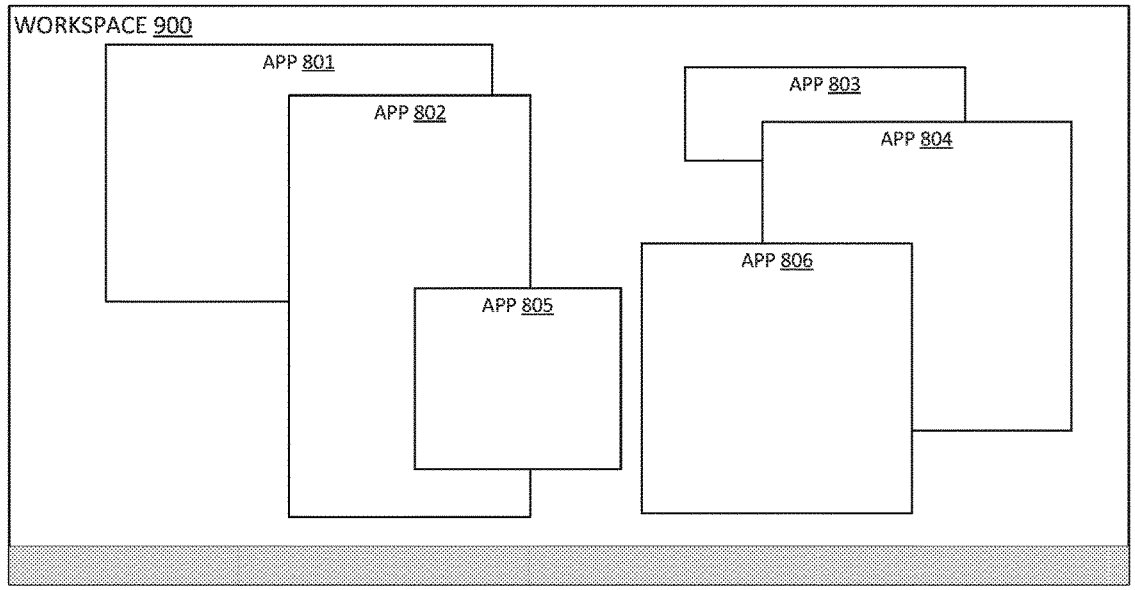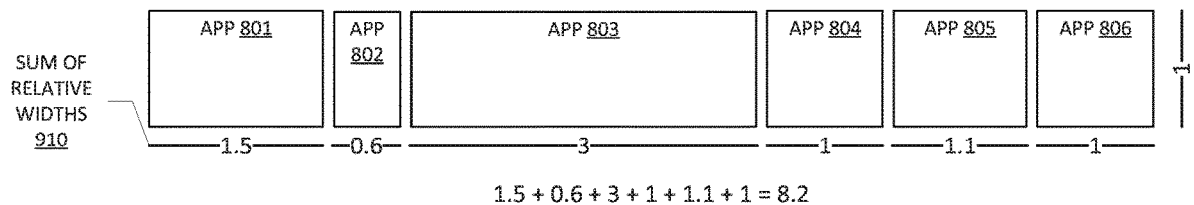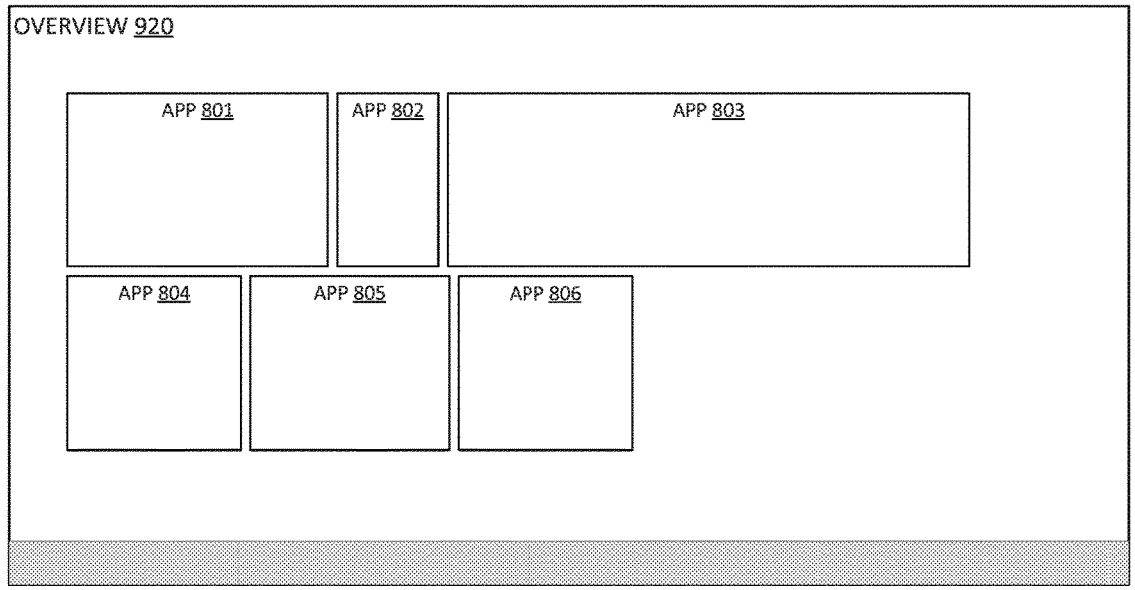
FIG. 9

1000

```
┌─────────────────────────────────────────────────────┐
│  DETERMINE A HEIGHT AND A WIDTH OF AN OVERVIEW       │
│  AREA ON A DISPLAY OF THE COMPUTING DEVICE           │
│                      1010                            │
└─────────────────────────────────────────────────────┘
                          │
                          ▼
┌─────────────────────────────────────────────────────┐
│  DETERMINE A TOTAL AVAILABLE RELATIVE WIDTH AS A     │
│  FUNCTION OF A GIVEN NUMBER OF ROWS BASED ON THE     │
│  HEIGHT AND THE WIDTH OF THE OVERVIEW AREA           │
│                      1020                            │
└─────────────────────────────────────────────────────┘
                          │
                          ▼
┌─────────────────────────────────────────────────────┐
│  CALCULATE A SUM OF RELATIVE WIDTHS Wₛ OF ONE OR     │
│  MORE APPS RUNNING IN THE WINDOWED MODE BY           │
│  NORMALIZING EACH OF THE ONE OR MORE APPS RUNNING    │
│  IN THE WINDOWED MODE TO A UNIT HEIGHT WHILE         │
│  MAINTAINING ITS ORIGINAL ASPECT RATIO               │
│                      1030                            │
└─────────────────────────────────────────────────────┘
                          │
                          ▼
┌─────────────────────────────────────────────────────┐
│  DETERMINE A NUMBER OF ROWS N BASED ON THE           │
│  CALCULATED SUM OF RELATIVE WIDTHS AND THE TOTAL     │
│  AVAILABLE RELATIVE WIDTH, WHEREIN                   │
│  $W_{AR}(N-1) \leq W_S < W_{AR}(N)$                  │
│                      1040                            │
└─────────────────────────────────────────────────────┘
                          │
                          ▼
┌─────────────────────────────────────────────────────┐
│  DETERMINING ONE OR MORE SPLIT POINTS IN BETWEEN     │
│  ROWS OF THE ONE OR MORE FIRST OVERVIEW WINDOWS      │
│  SUCH THAT THE ONE OR MORE FIRST OVERVIEW WINDOWS    │
│  ARE EVENLY DISTRIBUTED AMONG N ROWS                 │
│                      1050                            │
└─────────────────────────────────────────────────────┘
                          │
                          ▼
┌─────────────────────────────────────────────────────┐
│  ARRANGING THE ONE OR MORE FIRST OVERVIEW WINDOWS    │
│  WITH A NORMALIZED HEIGHT IN N ROWS                  │
│                      1060                            │
└─────────────────────────────────────────────────────┘
```

FIG. 10

MULTI-SPATIAL OVERVIEW MODE

RELATED APPLICATION

This application is a continuation of U.S. application Ser. No. 15/336,661, filed Oct. 27, 2016, the entire contents of which is hereby incorporated by reference.

BACKGROUND

Most software applications display information in windows presented for display in graphical user interfaces. A user may keep multiple applications open at once, but interact with only one application at a time. In multi-tasking environments, running multiple applications allows a user to quickly switch between apps. For example, the user may start an operation in a first application and switch to a second application while the first application completes the operation. It may be difficult for the user to keep track of all of the applications running concurrently on a computing system and to switch between the running apps.

SUMMARY

The subject technology provides a system and computer-implemented method for providing an overview mode for display on a computing device. In one or more implementations, the method comprises receiving a first user selection of a user interface element corresponding to an overview mode of a computing device; determining, in response to the first user selection, whether one or more applications are running in a windowed mode or a full-screen mode; when it is determined that the one or more applications are running in the windowed mode: generating a first overview window for each of the one or more applications; providing the one or more first overview windows in a flat arrangement; and providing, for display on the computing device in the overview mode, the one or more first overview windows in a first overview space; and when it is determined that the one or more applications are running in a full-screen mode: generating a second overview window for each of the one or more applications; providing the one or more second overview windows in a stacked arrangement; and providing, for display on the computing device in the overview mode, the one or more second overview windows in a second overview space. Other aspects include corresponding systems, apparatuses, and computer program products for implementation of the computer-implemented method.

In one or more implementations, a non-transitory machine-readable medium including instructions stored thereon that, when executed by a computing device, cause the computing device to perform a method comprising receiving a first user selection of an overview button corresponding to an overview mode of a computing device; determining, in response to the first user selection, whether one or more applications are running in a windowed mode or a full-screen mode; when it is determined that the one or more applications are running in the windowed mode: generating a first overview window for each of the one or more applications; providing the one or more first overview windows in a grid; and providing, for display on the computing device in the overview mode, the one or more first overview windows in a first overview space; and when it is determined that the one or more applications are running in the full-screen mode: generating a second overview window for each of the one or more applications; providing the one or more second overview windows in a stack; and providing, for display on the computing device in the overview mode, the one or more second overview windows in a second overview space.

In one or more implementations, a system comprises one or more processors and a memory, the memory having instructions stored thereon that, when executed by the one or more processors, cause the one or more processors to perform a method comprising receiving a first user selection of an overview button corresponding to an overview mode of a computing device; determining, in response to the first user selection, whether one or more applications are running in a windowed mode or a full-screen mode; when it is determined that the one or more applications are running in the windowed mode: generating a first overview window for each of the one or more applications; arranging the one or more first overview windows in a grid, each of the one or more first overview windows having has a normalized height and a same aspect ratio as a corresponding application running in the windowed mode; and providing, for display on the computing device in the overview mode, the one or more first overview windows in a first overview space; and when it is determined that the one or more applications are running in the full-screen mode: generating a second overview window for each of the one or more applications; providing the one or more second overview windows in a stack; and providing, for display on the computing device in the overview mode, the one or more second overview windows in a second overview space, the first and second overview windows respectively in the first and the second overview spaces provided in a most recently used order.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings:

FIG. 9 is a diagram illustrating an example graphical user interface in overview mode comprising two rows of overview windows in an overview space, in accordance with aspects of the subject technology.

FIG. 10 is a flowchart illustrating an example process for arranging overview windows in one or more rows in an overview space, in accordance with aspects of the subject technology.

DETAILED DESCRIPTION

Figure 1:
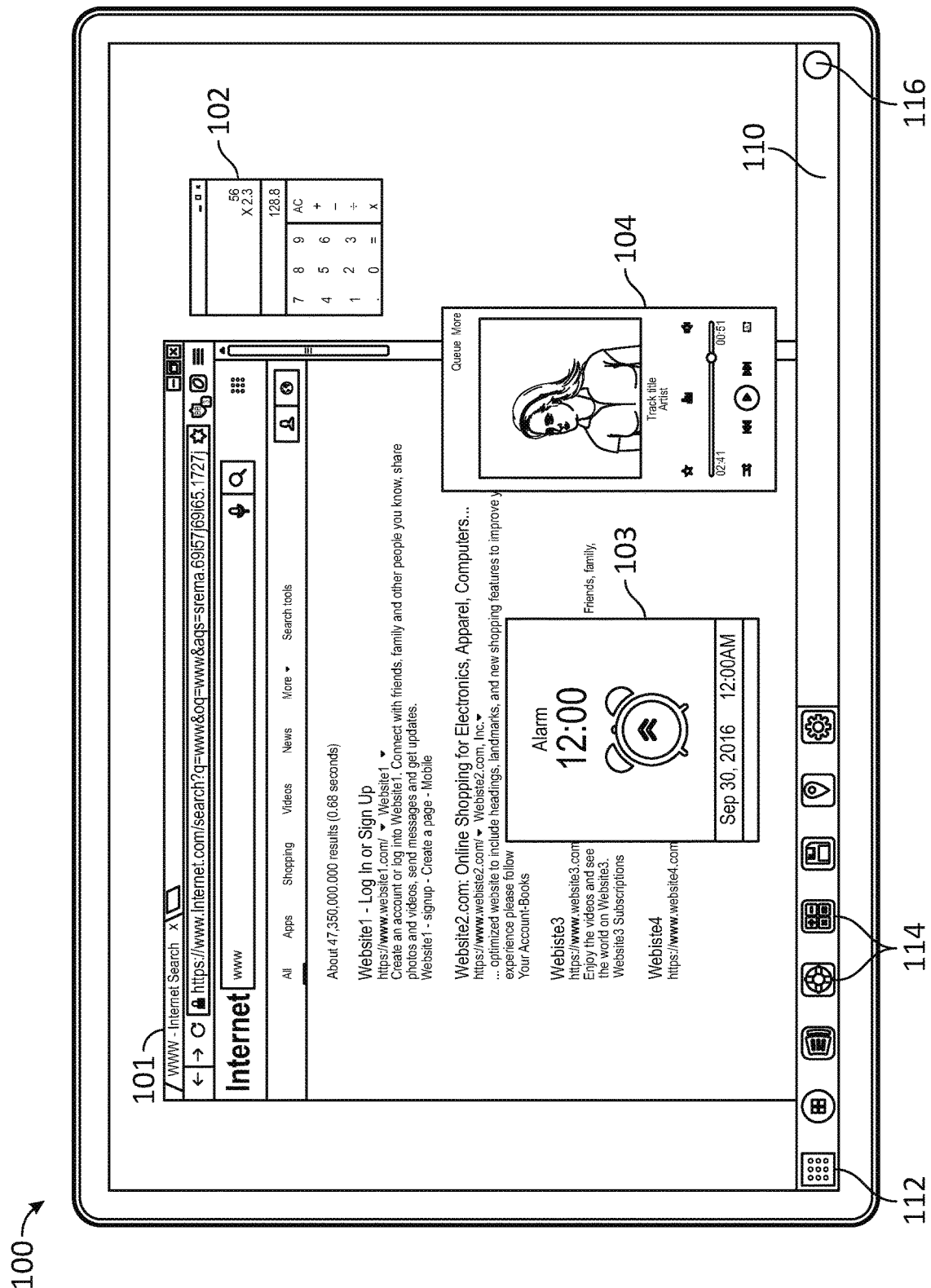
FIG. 1 is a diagram illustrating an example graphical user interface including multiple application windows on a computing device, in accordance with aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Traditionally, a software application runs on a desktop or laptop computer and provides a variety of functions. Whereas a mobile application, is designed for mobile devices and has a specific function. However, with the advance of the technology, the form factor and functional differences between the desktop applications and mobile applications are diminishing. Applications may run on desktops or laptops, including mobile devices. As used herein, the term "full-screen mode" refers to an application provided for display occupying a full screen size of a graphical user interface, and the term "windowed mode" refers to an application provided for display occupying a portion of the screen in a separate window within the graphical user interface. As used herein, the term "flat arrangement" may refer to a non-overlapping placement of overview windows, and the term "stacked arrangement" may refer to the placement of overview windows that are at least partially overlapping one another.

Multitask operating systems for computing devices often allow users to execute multiple applications (or applications) simultaneously. When an application is activated on a computing device, the computing device may present a user interface within a window on the graphical user interface of the operating system presented on a screen or display of the device. Some applications may allow users to dynamically adjust the application window sizes for better user experience, i.e., these applications may be running in a full-screen mode or a windowed mode. For example, a browser window can be maximized to occupy a full screen of the graphical user interface or be reduced to occupy only a part of the screen. Other applications, such as a calculator, may only display fix-sized windows, i.e., in the windowed mode, which occupy part of the screen when activated. The subject technology provides an overview mode in a graphical user interface of the computing device, which presents an overview for all running applications as an overlay on the graphical user interface. Users can select a user interface element such as an overview button displayed on the graphical user interface or a physical button on the device to initiate the overview mode, which may be turned off by a following selection of the same button. The user selection of the displayed overview button can be a key press shortcut, a mouse click or a gesture on a touch interface.

Running applications refer to any application that has been activated or opened and not yet terminated or closed by the user on the computing device. A running application may be active, for example, the user may be interacting with the application user interface, or the application window may be minimized to a shelf or taskbar while performing a task in the background. A running application may also be idle or inactive, for example, the application user interface may be waiting for user action but the user has shifted focus to another application, or an application looping in the background for input/output from other components of the computing device. The overview mode may present an overview window for each of the running applications, active or inactive, on the graphical user interface. In some implementations, the overview mode presents the running applications in a most recently used order. For example, the currently active application window may be displayed above other application windows.

The computing device can be, for example, a tablet computer (e.g., including e-book readers), a desktop computer, a mobile device (e.g., a smartphone or PDA), a personal computer device, a set top box (e.g., for a television), or any other devices having appropriate processor, memory, and communications capabilities for running apps. An example computing device comprises one or more processors configured to execute software instructions stored in a memory so that the computing device can execute multiple applications simultaneously, each of which may include one or more windows on a screen of the computing device. The graphical user interface arranges the windows for applications on the screen to provide an interactive platform between a user and the computer device. As the user selects the overview button, the computing device by way of software instructions functions as an overview manager to switch the graphical user interface from a current workspace to the overview mode.

In some implementations, the overview mode presents an overlay of all the application windows organized into two spaces on the graphical user interface of the computing device. Application windows may be sorted into the two spaces according to their respective window sizes at the moment that the overview mode is initiated. For example, an overview window may be generated for a full-screen application, i.e., an application running in full-screen mode. The generated overview window corresponding to the application running in full-screen mode may then be assigned to a full-screen overview space in the overview mode. Similarly, an overview window can be generated for a windowed application, i.e., an application running in windowed mode.

The overview window corresponding to the windowed application may be presented in a windowed overview space in the overview mode. The windowed application may be an application currently running in the windowed mode (but can be transitioned to the full-screen mode) or an application that can only run in a fixed window. An application can also be minimized into the system shelf (or taskbar). In this case, the overview window can be generated and assigned based on the window size of the application right before the minimization.

The overview mode may be managed by software instructions functioned as an overview manager. In some aspects of the subject technology, the overview manager is built into a window manager, which is a part of the operating system that controls the placement and appearance of windows within the graphical user interface. The window manager can support user interfaces of the applications in both full-screen windows and overlapping, re-sizable windows. As a part of the window manager, the overview manager can learn which applications are running and the window sizes of the running applications directly. Alternatively, the overview manager may be implemented separately from the window manager in the operating system. The window manager may provide system calls within the operating system for other software, such as the overview manager, to obtain information on which applications are running and in what window size each application is running. The overview manager may keep track of the information periodically or request the information when it is initiated.

The overview manager may arrange the overview windows in overlapping (e.g., a card stack) or non-overlapping (e.g., a flat or grid pattern) arrangement in the full-screen overview space and the windowed overview space. For example, full-screen overview windows may be arranged in a stack in the full-screen overview space, while windowed overview windows may be arranged side by side in one or more rows in the windowed overview space. Overview windows may also be arranged in different orders in the full-screen overview space and the windowed overview space. For example, an overview window corresponds to the most recently used application may be displayed on the top of a stack or at the top left of a row in the overview spaces. Other orders for arranging the application windows can be used, such as according to the freshness or ages of the applications and active or idle durations of the applications, among other temporal orders.

In aspects of the subject technology, the overview mode allows users to freely rearrange the overview windows in the overview spaces. For example, an overview window in the full-screen overview space or the windowed overview space can be moved around inside the current space or between the spaces. Consequently, when a full-screen overview window is moved from the full-screen overview space to the windowed overview space, the full-screen application corresponding to the moved overview window may be transitioned to the windowed mode. The reduced window size of the full-screen application may be a predetermined window size or its last window size before being expanded into full-screen. On the other hand, a running application may transition between the full-screen mode and the windowed mode outside of the overview mode, the corresponding overview window of the application may be assigned to either of the overview spaces in the overview mode depending on the running mode of the application when the overview mode is initiated.

The overview mode also allows users to switch between running apps. In response to user selecting applications from the full-screen overview space and/or the windowed overview space spaces in the overview mode, the selected applications may become activated. For example, a selected application may come into focus in the forefront of the graphical user interface on the computing device. Upon the activation of the selected applications, the overview mode can be automatically turned off and exited, while the selected application is displayed at the forefront of the graphical user interface. Users may select windows in overview mode in different ways: a single select for an individual application (e.g., a mouse click or a gesture) or multi-select for two or more applications (e.g., click and hold or longer press).

FIG. 1 is a diagram illustrating an example graphical user interface 100 including multiple application windows on a computing device, in accordance with aspects of the subject technology. A user in the process of using the computing device may launch multiple applications, each of which may open one or more windows. The example graphical user interface 100 includes multiple running application windows 101-104. For example, application 101 is a browser, which can be running in the windowed mode or maximized to full-screen on the graphical user interface 100, while application 102 is a calculator application, which may operate only in the windowed mode.

The example graphical user interface 100 also includes a shelf (or taskbar) 110 at the bottom of the screen. The shelf 110 is where users can launch applications, pin applications, see open windows, and change settings. As shown in FIG. 1, the shelf 110 comprises an application launcher icon 112, multiple application icons 114 and an overview button 116. The running application windows 101-104 can each be minimized to an icon in the shelf 110. Each of the application icons 114 may show visual indications, such as highlight or shade, when the corresponding application is running. The shelf 110 may be hidden when an application window, such as the browser window 101, is maximized to full-screen on the graphical user interface 100. The overview button 116 can be selected by a click or a gesture to initiate the overview mode. When overview mode is initiated, the shelf 110 can be hidden. Alternatively, the shelf 110 may remain on the screen throughout the overview mode. Note that the application launcher icon 112, the application icons 114 and the overview button 116 can be arranged at different positions within the shelf 110. The shelf 110 may include more or less components and may be placed in different part of the screen.

Figure 2A:
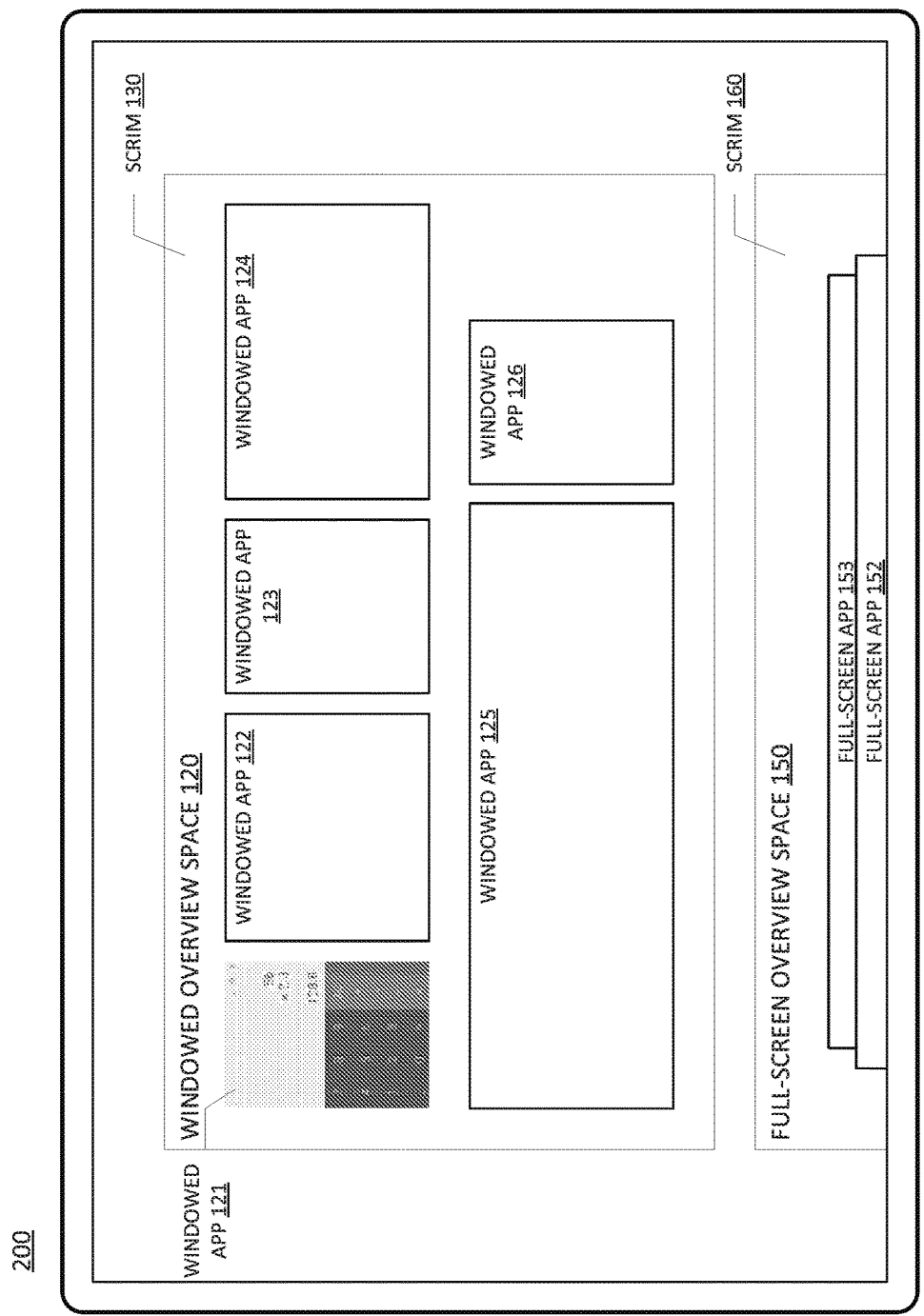
FIGS. 2A-2B are diagrams illustrating an example graphical user interface in overview mode comprising a windowed overview space and a full-screen overview space, in accordance with aspects of the subject technology.
Figure 2B:
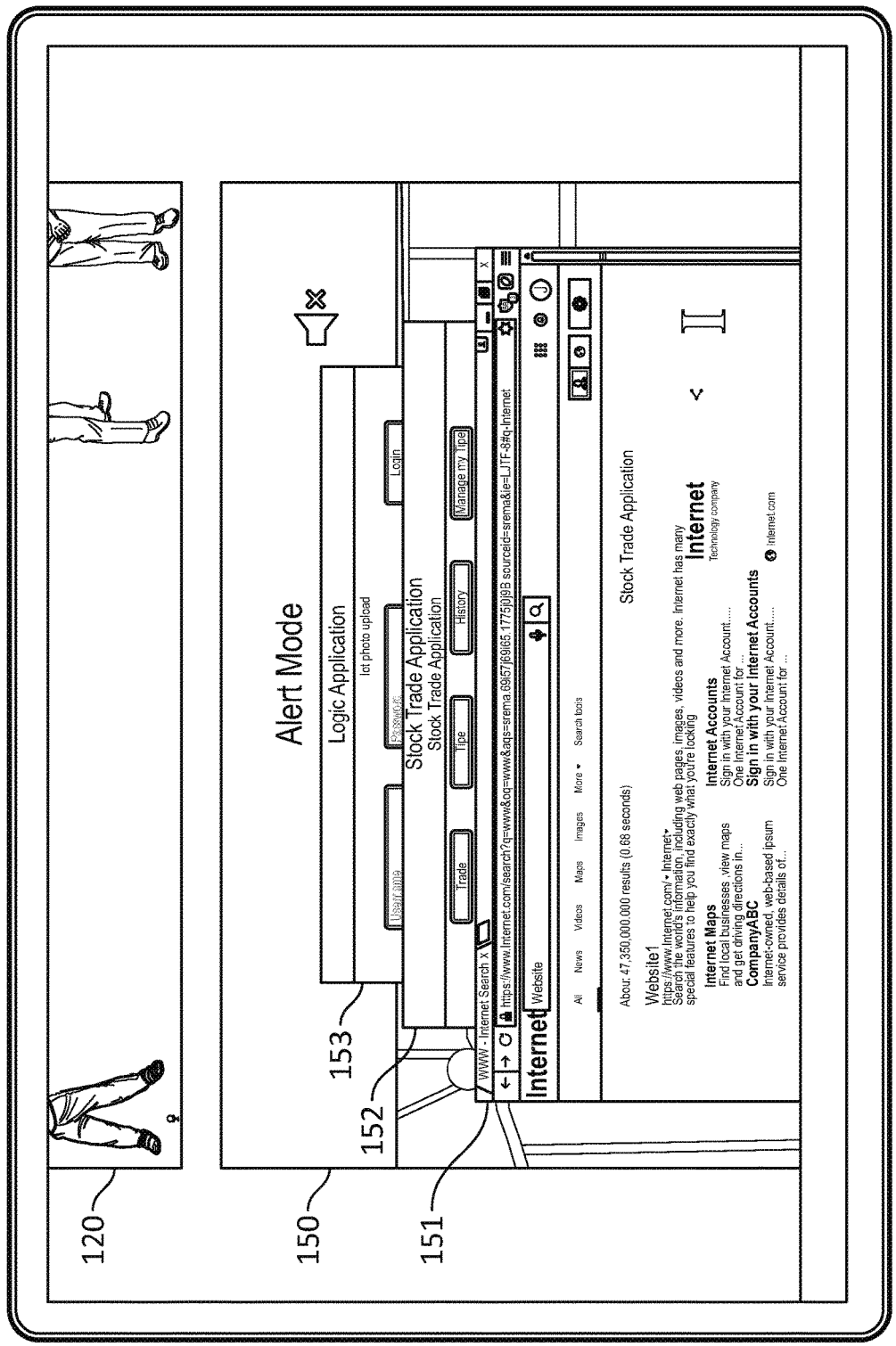

FIGS. 2A-2B are diagrams illustrating an example graphical user interface 200 in overview mode comprising a windowed overview space and a full-screen overview space, in accordance with aspects of the subject technology. In response to a user selection of the overview button 116 in FIG. 1, the overview mode is initiated to display a windowed overview space 120 and a full-screen overview space 150. As depicted in FIGS. 2A and 2B, the windowed overview space 120 and the full-screen overview space 150 are vertically aligned on a scrim 130 and a scrim 160, respectively. The scrims 130 and 160 may be designed with different color or texture to differentiate from each other. It is shown that the windowed overview space 120 is displayed above the full-screen overview space 150. Other arrangements of the two spaces are also possible, for example, the full-screen overview space 150 may be placed on top and the windowed overview space 120 and the full-screen overview space 150 may be horizontally aligned.

FIG. 2A shows a first part of the example graphical user interface 200 in overview mode. In the example graphical user interface 200, the windowed overview space 120 is displayed in full at the center of the screen with only a part of the full-screen overview space 150 shown below. Because the two overview spaces do not fit in the field of view of the graphical user interface together, scrolling may be used to switch the view between spaces. In alternative designs, the two overview spaces may be resized to fit within the field of view. The windowed overview space 120 in the example graphical user interface 200 in overview mode can accommodate more than one rows of the overview windows. For example, overview windows 121-126 occupy two separate rows. The most recently used windowed application 121, a calculator as shown in FIG. 2A, is placed at the top left of the top row.

The windowed overview space 120 may allow a user to adjust the order of the overview windows inside the overview space. For example, the user may move any of the overview windows 122-126, e.g., the overview window 125, to the top left position of the first row to make the application corresponding to the overview window 125 the most recently used application. Furthermore, clicking on any one of the overview windows 121-126, the overview mode may exit and the application corresponding to the selected overview window may come into focus in the forefront of the graphical user interface. After exiting out of the overview mode, the user may later shift focus to another windowed application, e.g., the windowed application 124. When the user initiates the overview mode again, the windowed application 124 may be placed at the top left of the first row in the windowed overview space 120.

In some implementations, each of the overview windows in the windowed overview space 120 is generated with a normalized height and the same aspect ratio as the corresponding applications as shown in FIG. 2A. The normalized height may be a value selected from a predetermined range, for example, a range between a minimum height and a maximum height. The minimum height may be a predefined value to ensure rows are not too small to be seen, and the maximum height may be no larger than a certain percentage (e.g., 80%) of the height of the windowed overview space 120. The overview windows may be generated accordingly and sorted into the windowed overview space 120. More details of the row arrangement will be discussed below in reference to FIGS. 8-10.

FIG. 2B depicts a second part of the example graphical user interface 200 in overview mode when the user scrolls up to view the full-screen overview space 150. In FIG. 2B, the full-screen overview space 150 is displayed in full at the center of the screen with only a part of the windowed overview space 120 shown above. Because the two overview spaces do not fit in the field of view of the graphical user interface together, scrolling may be used to shifting between the views of the spaces. The scrolling may be done by pressing an arrow key, clicking within the part of the full-screen overview space 150, or using a scroll-up gesture. As shown in FIG. 2B, the overview windows 151-153 in the full-screen overview space 150 are of the same size and arranged in a stack arrangement, with the most recent browser window displayed on the top of the stack.

The full-screen overview space 150 may also allow a user to adjust the order of the overview windows inside the overview space. For example, the user may move either of the overview windows 152 and 153, e.g., the overview window 152, to the top of the stack so that the application corresponding to the overview window 152 becomes the most recently used application. When the user exits the overview mode, the full-screen application 152 may come into focus in the forefront of the graphical user interface. Furthermore, clicking on any one of the overview windows 151-153, the overview mode may exit and the full-screen application corresponding to the selected overview window may come into focus in the forefront of the graphical user interface. Afterwards, the user may shift focus to another full-screen application, e.g., full-screen application 153. When the user initiates the overview mode following the shift, the overview window 153 may be placed on the top of the stack in the full-screen overview space 150.

The overview mode may allow overview windows to be moved between the windowed overview space 120 and the full-screen overview space 150. For example, the user can drag the overview window 151 into the windowed overview space 120. The overview window 151 may be resized to the same height of the overview windows 121-126 in the windowed overview space 120. The browser window 151 may also be transitioned from the full-screen mode into the windowed mode, which may be revealed once the user exits the overview mode and activates the browser window 151. Similarly, the user may move any overview windows 121-126, e.g., the overview window 121, from the windowed overview space 120 to the full-screen overview space 150. The calculator window 121 may be maximized into a full-screen mode scientific calculator, which may come into focus in the forefront of the graphical user interface when the user selects the calculator window 121 in the full-screen overview space 150 and exits the overview mode.

Figure 3:
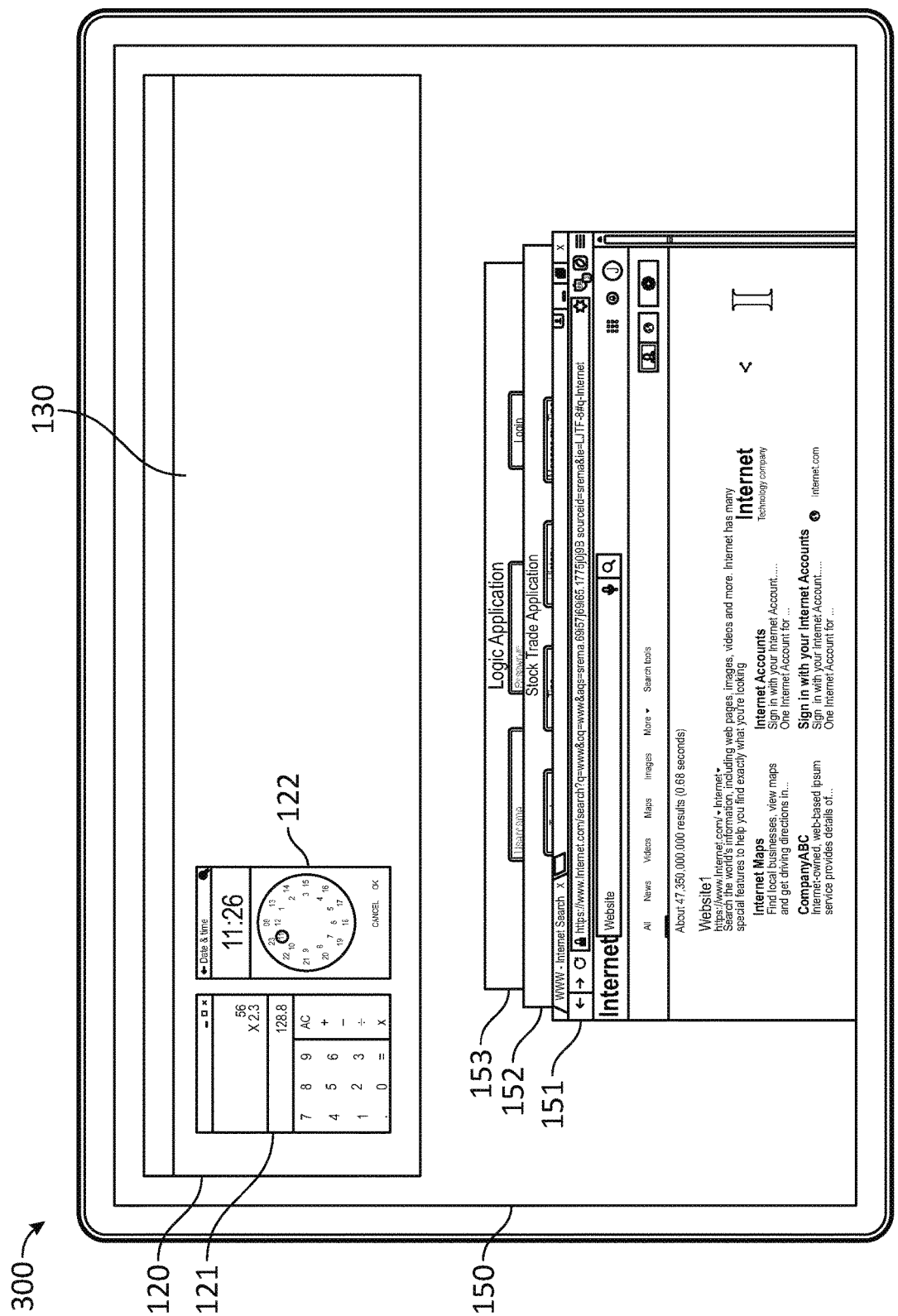
FIG. 3 is a diagram illustrating an example graphical user interface in overview mode comprising a windowed overview space and a full-screen overview space, in accordance with aspects of the subject technology.

FIG. 3 is a diagram illustrating an example graphical user interface 300 in overview mode comprising a windowed overview space and a full-screen overview space, in accordance with aspects of the subject technology. In response to a user selection of the overview button 116 in FIG. 1, the overview mode is initiated to display a windowed overview space 120 and a full-screen overview space 150, each occupies a half of the screen. The windowed overview space 120 includes a scrim 130 as the background, while the full-screen overview space 151 has no scrim. In FIG. 3, the windowed overview space 120 is placed above the full-screen overview space 150. Other arrangements of the two overview spaces are also possible, for example, the full-screen overview space 150 may be placed above the windowed overview space 120. The windowed overview space 120 and the full-screen overview space 150 may be horizontally aligned with either space occupies a half of the screen.

Similar to the example graphical user interface 200 in overview mode, the example graphical user interface 300 in overview mode allows users to freely arrange the overview windows 121-122 in the windowed overview space 120 and overview windows 151-153 in the full-screen overview space 150. For example, an overview window in either the windowed overview space 120 or the full-screen overview space 150 can be selected and moved to the other overview space. When an overview window in the windowed overview space 120 is moved to the full-screen overview space 150, the application corresponding to the moved overview window may be transitioning to the full-screen mode. In contrast, when an overview window in the full-screen overview space 150 is moved to the windowed overview space 120, the application corresponding to moved overview window may be transitioning to the windowed mode. These changes in the window sizes may not be revealed until the overview mode is exited and application windows are brought to the foreground of the graphical user interface.

Figure 4:
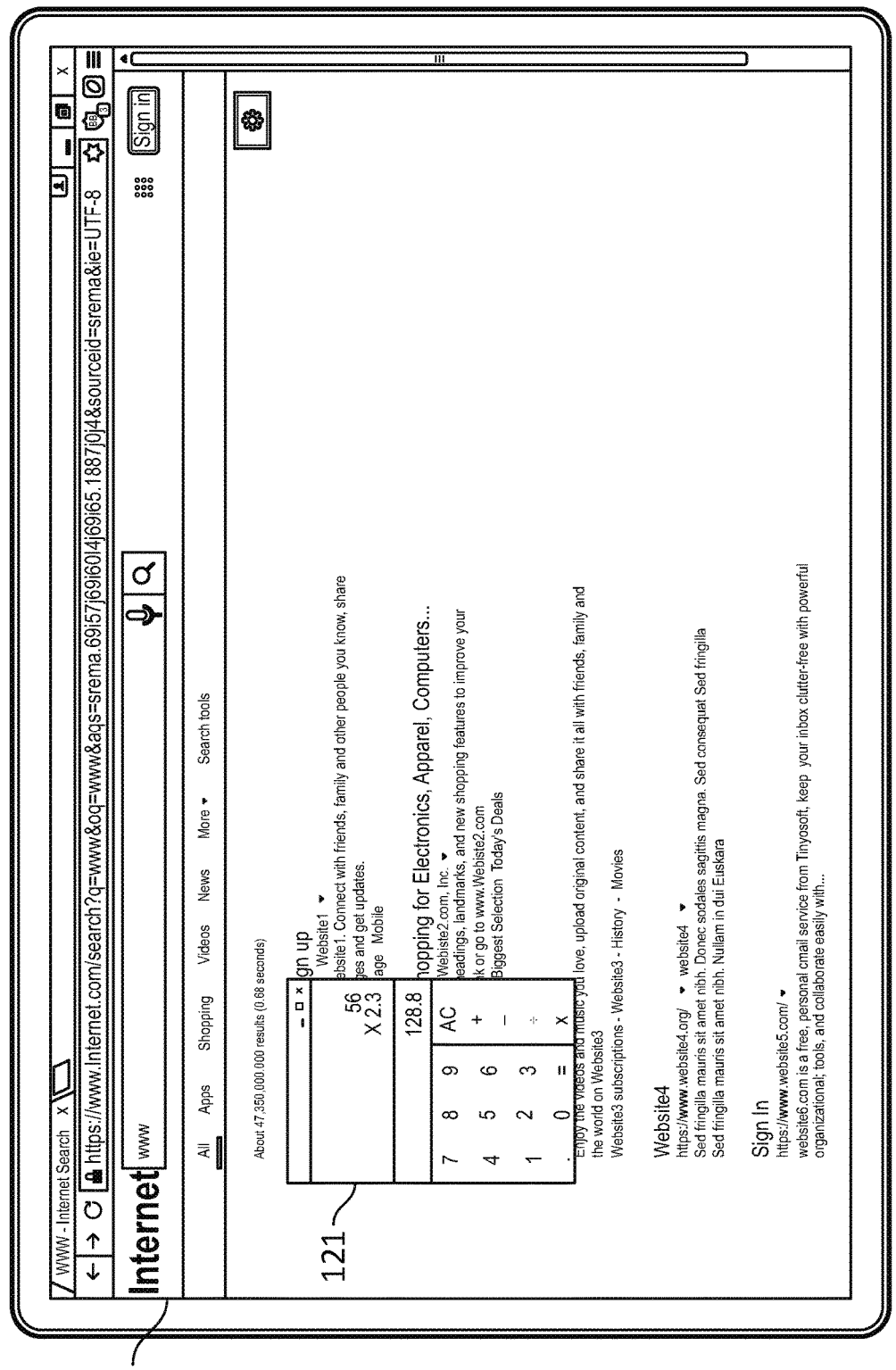
FIG. 4 is a diagram illustrating an example of graphical user interface including a visiting windowed application displayed on top of a full-screen application, in accordance with aspects of the subject technology.

FIG. 4 is a diagram illustrating an example graphical user interface 400 including a visiting windowed application 121 displayed a full-screen application 151, in accordance with aspects of the subject technology. When a full-screen application is just activated, other application windows, either in full screen mode or windowed mode, may be hidden underneath the newly activated full-screen application. The example graphical user interface 400 of FIG. 4 includes the visiting application 121, which is running in the windowed mode, to be placed, as an overlay, on top of the full-screen application 151. The visiting windowed on top of a full-screen application may be a result of selecting both applications from the overview mode in some implementations. In addition to or alternatively, the example graphical user interface 400 may also cause the overview mode to arrange both applications as the most recently used applications in their respective overview spaces.

Figure 5:
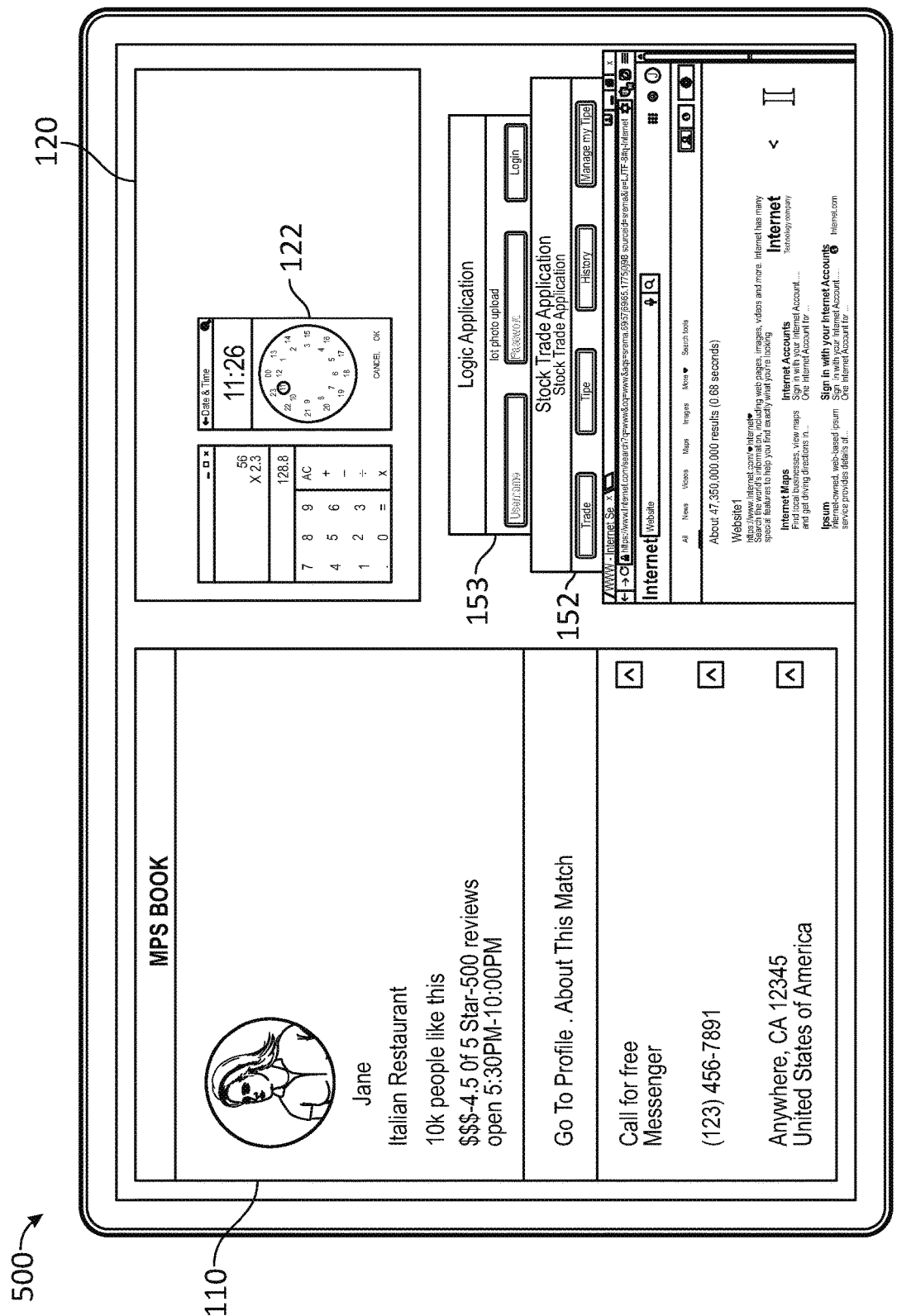
FIG. 5 is a diagram illustrating an example graphical user interface in overview mode with split views, in accordance with aspects of the subject technology.

FIG. 5 is a diagram illustrating an example graphical user interface 500 in overview mode with split views, in accordance with aspects of the subject technology. User may be able to snap application windows to either sides of the screen of the computing device to activate the split view mode. The split view mode can turn the graphical user interface into two separate sections side by side, thus allows users to interact with more than one application simultaneously and makes it easier to compare applications and webpages. The overview mode may be presented in one of the split views. In FIG. 5, an application 110 currently occupies the left half of the split views, while multiple other applications running concurrently in the right half of the split views. When the user initiates the overview mode in the split view, the overview mode can be displayed within the right half of the split views. For example, the windowed overview space 120 and the full-screen overview space 150 are presented in the right split view side by side with the split view application 110 on the left. The graphical user interface 500 in overview mode presented in a split view is merely an example and other proportions of the split view and overview spaces may be used.

Figure 6:
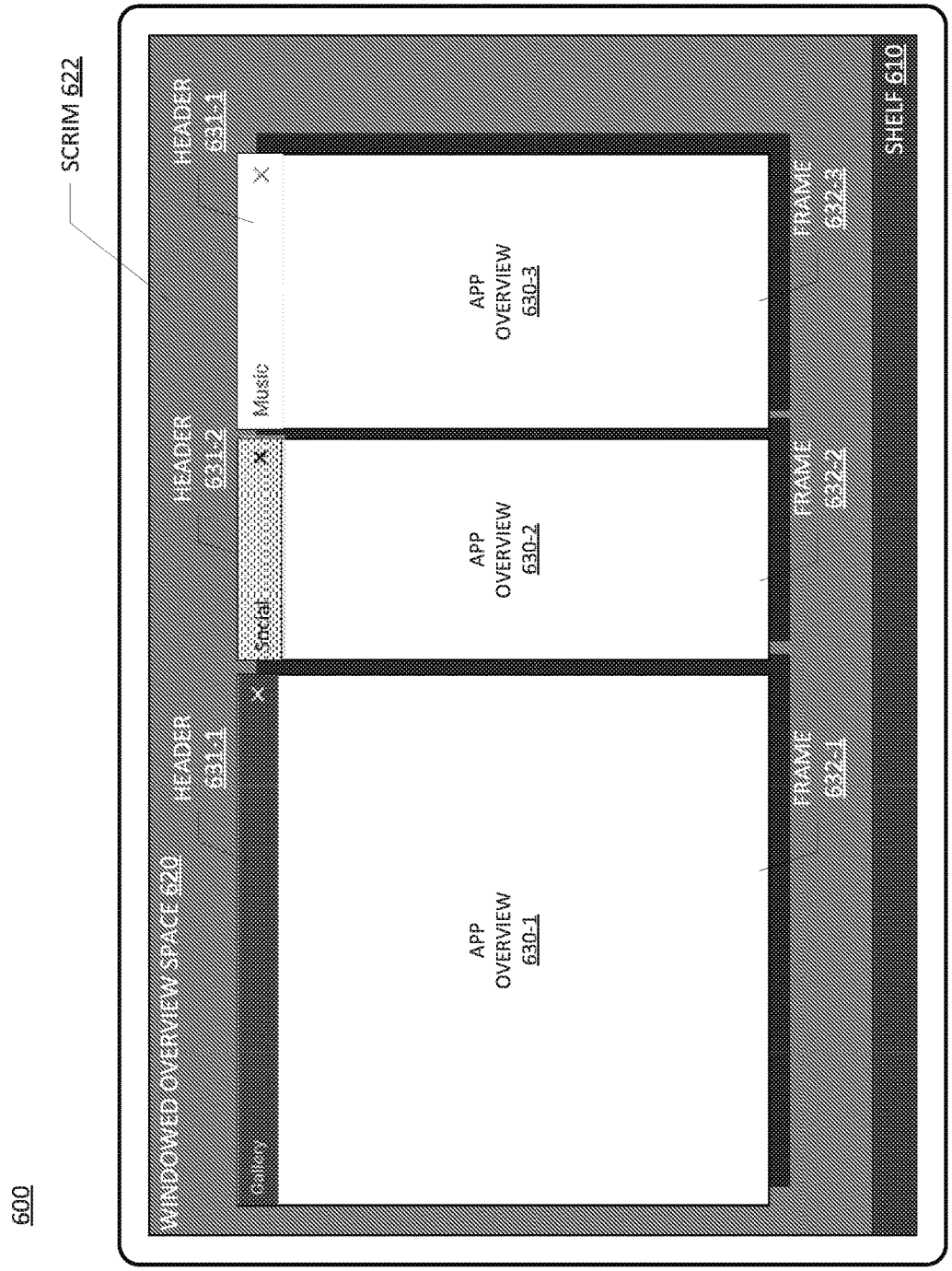
FIG. 6 is a diagram illustrating an example graphical user interface in overview mode comprising a single windowed overview space, in accordance with aspects of the subject technology.

FIG. 6 is a diagram illustrating an example graphical user interface 600 in overview mode comprising a single windowed overview space, in accordance with aspects of the subject technology. The example graphical user interface 600 in overview mode comprises a shelf 610 and a single windowed overview space 620, which includes three application overview window windows 630 laid on a background scrim 622. The full-screen overview space is not present in the overview mode may be due to the fact that there is no application running in the full-screen mode when the overview mode is initiated. Another possibility may be that the user merges the two overview spaces in the overview mode by moving all the overview windows in the full-screen overview space into the windowed overview space 620.

In some implementations, when generating the overview window, a windowed application frame is replaced by an overview window frame scaled to a normalized height. Application controls, such as the titles, headers, menus and buttons in the application windows may also be removed and replaced with a fixed-height header on top of the overview frame. For example, each of the overview windows 630 in the example graphical user interface 600 in overview mode includes a header 631 of the same height, e.g., original application header of 32 pixels, and a frame 632 of the normalized height to fit into one row in the windowed overview space 620. The headers 631 of the overview windows 630 may also display a title from the original applications and a single close button. For instance, the overview windows 630-1, 630-2 and 630-3 represent the applications of "Gallery," "Social," and "Music," respectively.

In some implementations, the headers 631 also maintain the colors of the original application headers. For example, the headers 631-1, 631-2 and 631-3 carry the same colors of their respective original application headers. In addition or alternatively, the headers 631 can be rendered with transparency to reflect the color or texture of the scrim 622 or wallpapers on the screen.

Figure 7:
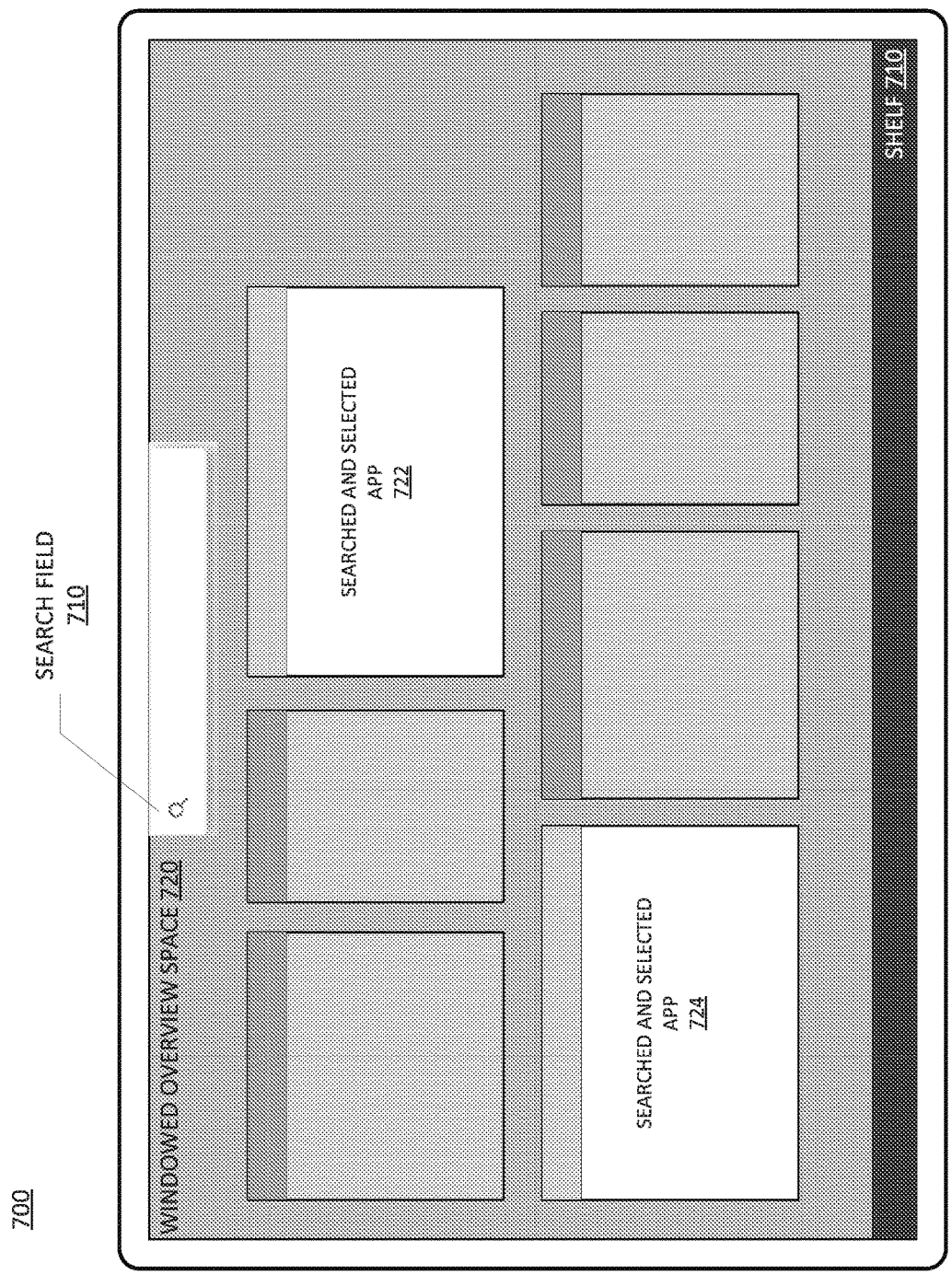
FIG. 7 is a diagram illustrating an example graphical user interface in overview mode including an overview search, in accordance with aspects of the subject technology.

FIG. 7 is a diagram illustrating an example graphical user interface 700 in overview mode comprising an overview search, in accordance with aspects of the subject technology. In the example graphical user interface 700 in overview mode, a total of seven overview windows are arranged into two rows in the windowed overview space 720. A search field 710 is placed horizontally at the center top of the windowed overview space 710 for users to search for related application windows. For example, a user may enter a search term "social" in the search field 710. If the search is successful, any overview windows with titles related to social applications, such as searched and selected applications 722 and 724, may be highlighted as search results. Other unrelated application overview windows may be dimmed out to differentiate from the search results.

Figure 8:
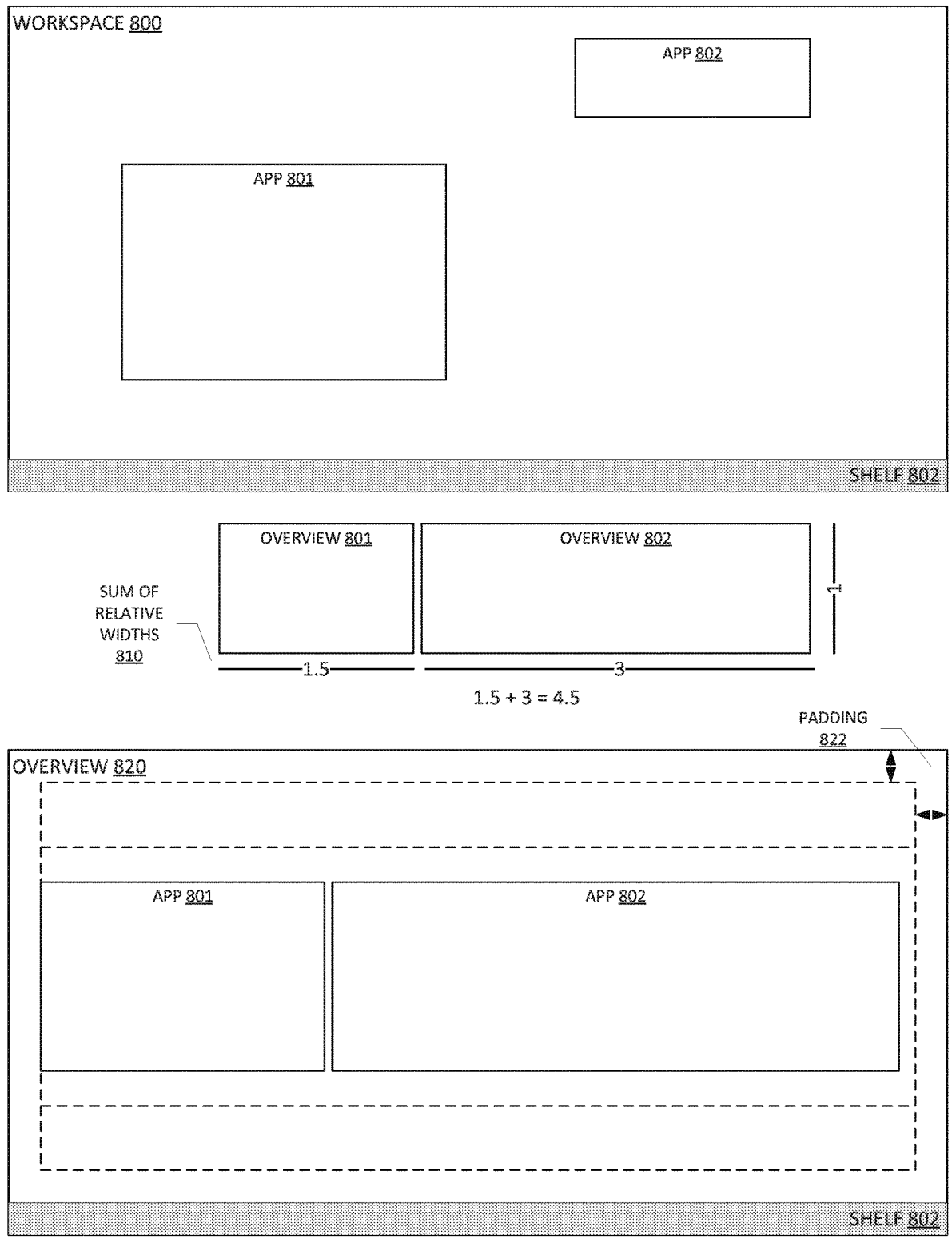
FIG. 8 is a diagram illustrating an example graphical user interface in overview mode comprising one row of overview windows in an overview space, in accordance with aspects of the subject technology.

FIG. 8 is a diagram illustrating an example graphical user interface 820 in overview mode comprising one row of overview windows in an overview space for an example workspace 800, in accordance with aspects of the subject technology. shown on the top of FIG. 8 includes a shelf 802 and two running application 801-802. As described above, when the overview mode is initiated, each of the running application windows may be resized to generate an overview window with a normalized height while maintaining its original aspect ratio. In one or more implementations, to determine a number of rows for arranging the generated overview windows, all the running application windows in the workspace may be first sorted accordingly to a most recently used (MRU) order, and a sum of relative widths of all the overview windows is calculated.

For example, the aspect ratios for application windows 801 and 802 are 3:2 and 3:1, respectively. By normalizing the heights of application windows 801 and 802 to a unit height, the relative widths of the application windows 801 and 802 are 1.5 and 3, respectively. Therefore, the sum of the relative widths 810 of the overview windows 801-802 is 1.5+3=4.5, as calculated based on the aspect ratios of each of the application windows 801-802 by assuming the normalized height is a unit (i.e., one).

The calculated sum of relative widths can then be compared with a list of total available relative width values corresponding to various row numbers. If the calculated sum of relative widths is less than the total available relative width afforded by a given number of rows, then the number of rows is found. For example, assuming in the example overview graphical user interface 820, the total available relative widths are 5 for one row and 15.3 for two rows. Since the sum of the relative widths 810 for application windows 801 and 802 is 4.5 and less than the total available relative widths 5 for one row, the application windows can be arranged into just one row.

The total available relative width is calculated by finding a minimum row height for a given number of rows. The minimum row height for a given number of rows n is the same as a maximum row height for (n+1) rows. The minimum row height is design specific and often described in a unit of DP. DP (or DiP) stands for device-independent pixel, which defines a pixel size independent of devices. With the introduction of DP, a multiplier is all needed to converting UI design for different PPIs. PPI stands for pixels per inch, which counts the number of pixels a screen displays per inch. For example, for a 27 inch display monitor with pixel screen width of 2560 and an actual screen width of approximately 23.5 inches, the PPI value can be calculated as 2560/23.5=109 PPI.

Hardware platforms for the computing devices may include a wide range of devices built by various OEMs with few restrictions in term of scale. As a result, a virtually unlimited variety of screen sizes and PPI are marketed, from phones as big as tablets and tablets almost as small as phones. DP helps with discussing a spec between different parties like the designer and the engineer. For example, a developer creates a button of 48×48 pixels, which is recommended on a first target device with normal PPI. For a second device with twice as many PPI (i.e., a multiplier of 2×), the button may be rendered twice-as-large, i.e., 96×96 pixels to have the same visual effect. With the DP value and multiplier, designers can specify the size in DP across all devices of different devices PPI. For example, the same button of 48×48 DP will be rendered in 96×96 pixels on the second device, because the second device has a multiplier of 2×.

An example design specification is described herein with reference to the example overview graphical user interface 820. Assume that the total overview area has a width W=1280 DP and height H=688 DP (excluding a shelf 802 of 32 DP), and an overview padding 822 is chosen at 34 DP (i.e., five percent of the height H) along the four edges of the total area. The overview area limits may also dictate that the rows are aligned to the left and vertically centered to occupy, for example, a maximum 80% of the total height of the overview window area. Based on these limits, the actual overview area would be W×H=1212×496 DP. The maximum row height for two overview window rows n=2 can then be calculated by: $H_2=(496-10)/2=243$ DP, which is the minimum row height for n=1. The 10 DP extracted from the height is a gap for row separation between two rows. Therefore, the total available relative width for one row n=1 can be calculated by $W_{AR}(n=1)=W/H_2=1212/243=4.99$, which is rounded to 5.

Similarly, the maximum row height for three overview window rows n=3 can then be calculated by: $H_2=(496-10\times 2)/3=158.6$ DP, which is the minimum row height for n=2. The total available relative width for one row n=2 can be calculated by $W_{AR}(n=2)=W/H_3=2\times(1212/158.6)=15.3$. Note that this example is for illustration purpose, other design specifications and more considerations may be applied, for example, by adding a fixed height for application window headers, such as headers 631 in FIG. 6.

FIG. 9 is a diagram illustrating an example graphical user interface 920 in overview mode comprising two rows of overview windows in an overview space for an example workspace 900, in accordance with aspects of the subject technology. The example workspace 900 includes six applications 801-806 running in windowed mode with various aspect ratios. Assuming the aspect ratios for application windows 801-806 are 3:2, 3:5, 3:1, 1:1, 11:10, and 1:1, respectively. By normalizing the heights of application windows 801-806 to a unit height, the relative widths of the application windows 801-806 are 1.5, 0.6, 3, 1, 1.1 and 1, respectively. Therefore, the sum of the relative widths 910 of the overview windows 801-806 is 1.5+0.6+3+1+1.1+1=8.2. Since the sum of the relative widths 910 is smaller than the total available relative width for two rows $W_{AR}(n=2)=15.3$, the overview windows for applications 801-806 can be arranged into two rows in the windowed overview space according to the example design specification.

In case the required number of rows is greater than one, the overview windows for applications running in windowed mode may be split as evenly as possible. In the example graphical user interface 920 in overview mode, the overview windows 801-806 for windowed applications can be simply iterated through in the MRU order one by one while summing the respective relative window widths. The split point with the smallest difference in the sums of relative widths between the two rows can be selected as the row split. This way, the application windows always maintain the MRU order, left to right and top to bottom, regardless of the number of rows it takes to display all the overview windows. Other split methods may be applied as well, such as splitting by indices of the overview windows.

After the number of rows and split point(s) are determined, the actual rendering size of each row and overview window can be determined. The overview window sizes may be determined by finding the longest row of windows (by sum of relative widths) and finding a window height for the longest row to fill the width of the overview space. The row height of the longest row can then be applied to all the other rows of the overview windows. For the shorter rows, the overview windows may be left-aligned within each row. The vertical position of the rows (and in turn, the windows) may be determined by centering the cumulative height of the rows (plus the gapping between rows) within the available overview space.

In aspects of the subject technology, all graphical user interface transitions during the transition from workspace display to overview mode, such as closing, dragging, or adding application windows, can be animated by first going through a pre-layout pass, where new window positions and sizes are calculated and cached, before an animator is called to animated each of overview windows to the respective cached positions and sizes.

FIG. 10 is a flowchart illustrating an example process 1000 for arranging overview windows in one or more rows in an overview space, in accordance with aspects of the subject technology. For explanatory purposes, the blocks of example process 1000 are described herein as occurring in serial, or linearly. However, multiple blocks of example process 1000 may occur in parallel. In addition, the blocks of example process 1000 may not be performed in the order shown and/or one or more of the blocks of example process 1000 need not be performed.

In the depicted example flowchart, a computing device by way of software instructions functioning as the previously described overview manager, determines in block 1010 a height and a width of an overview area on a display of the computing device. The overview area includes a windowed overview space in which all the applications running in the windowed mode are arranged into one or more rows in a flat arrangement when the overview mode is initiated. In one implementation, the overview area is the area on a screen of the display excluding the shelf and padding area around top, bottom, left and right sides of the screen, e.g., as illustrated and described with respect to FIG. 8.

In block 1020, the overview manager determines a total available relative width $W_{AR}(n)$ as a function of a given number of rows n based on the height and width of the overview area. As described with respect to FIG. 8, the total available relative width of a given number of rows can be determined by first calculating a minimum height of n rows, which is the same as the maximum height of n+1 rows. The minimum height of n rows (or the maximum height of n+1 rows) may be calculated, for example, by subtracting gaps between rows from the height of the overview area and dividing the result by the given number of rows. The total available relative width $W_{AR}(n)$ may be calculated, for instance, by dividing the width of the overview area by the minimum height of n rows and multiplying the result with the number of rows n.

The overview manager can then calculate a sum of relative widths $W_s$ for all the applications running in the windowed mode in block 1030. In one implementation, each of the applications running in the windowed mode may be normalized to a unit height while maintaining its original aspect ratio to fit in the windowed overview space. The sum of the relative widths is simply the sum of the widths for all the resized application windows. Alternatively or in addition, an overview window may be generated for each of the applications running in the windowed mode. Each generated overview window may have a unit height and the same aspect ratio as its corresponding windowed application. The sum of the relative widths can be calculated as the sum of the widths for the generated overview windows.

In order to determine the number of rows N for arranging the applications running in the windowed mode in the windowed overview space, the overview manager next may compare the sum of relative widths $W_s$ to the total available relative width $W_{AR}(n)$ for various numbers of rows n. In one implementation, if an N satisfies $W_{AR}(N-1) \leq W_S < W_{AR}(N)$, then the number of rows is determined to be N. In case N is more than one, the overview manager may determine N−1 split points in block 1050 between rows of the windowed overview windows (or resized application windows). In an aspect, the split points may be selected such that the windowed overview windows are distributed as evenly as possible among the N rows. Once the number of rows N and the split points are determined, the overview manager can arrange the windowed overview windows of the same height in N rows in the windowed overview space in block 1060.

Figure 11:
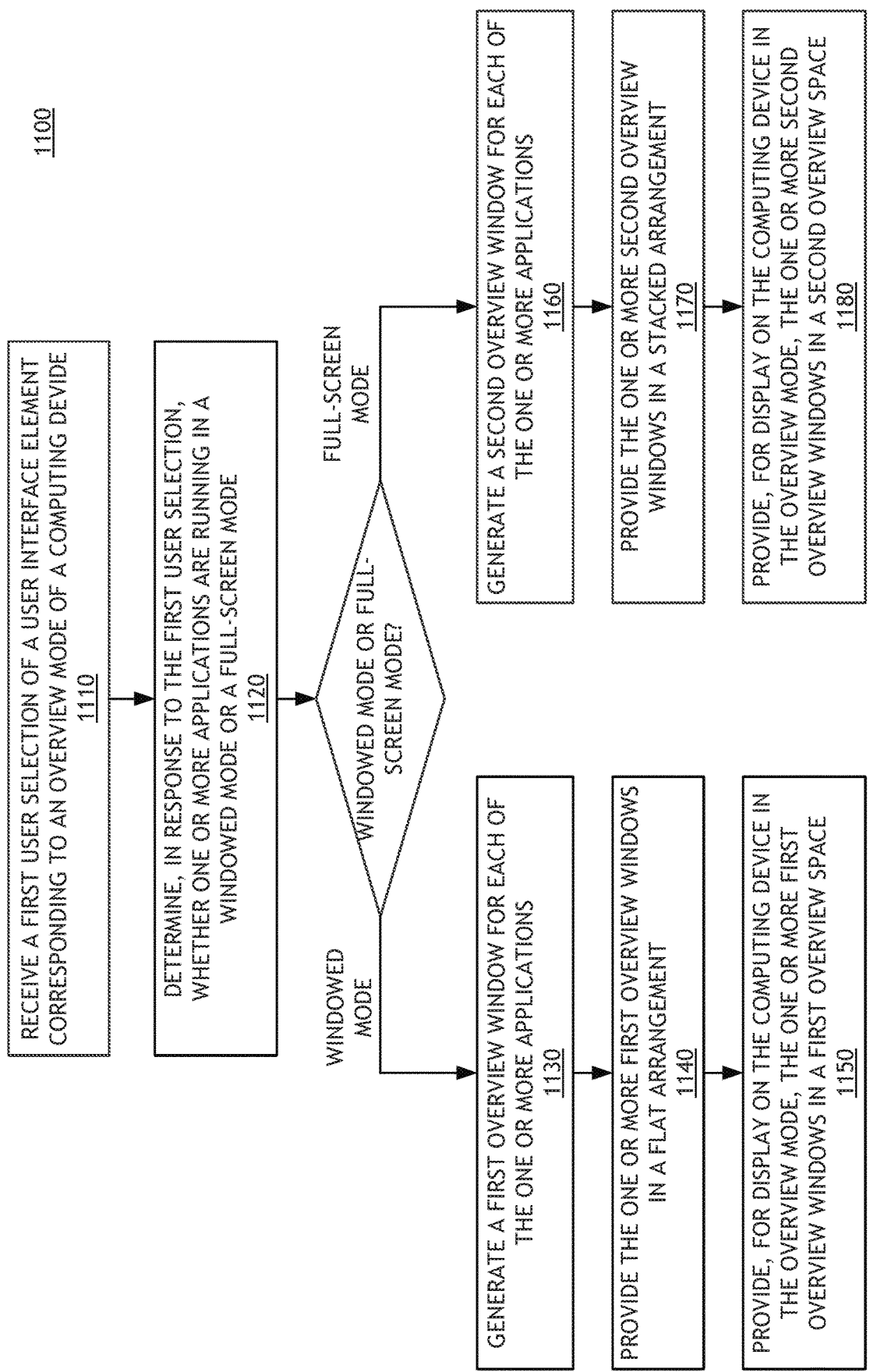
FIG. 11 is a flowchart illustrating an example process for providing an overview mode in a graphical user interface, in accordance with aspects of the subject technology.

FIG. 11 is a flowchart illustrating an example process 1110 for providing an overview mode in a graphical user interface, in accordance with aspects of the subject technology. For explanatory purposes, the blocks of example process 1100 are described herein as occurring in serial, or linear order. However, multiple blocks of example process 1100 may occur in parallel. In addition, the blocks of example process 1100 need not be performed in the order shown and/or one or more of the blocks of example process 1100 need not be performed.

In the depicted example flowchart, a computing device by way of software instructions functioning as the previously described overview manager, receives in block 1110 a first user selection of a user interface element corresponding to an overview mode of a computing device. An example of the user interface element is the overview button 116 shown on the graphical user interface in FIG. 1. The user interface element may be any other interface element or a physical button corresponding to the overview mode. When the overview mode is initiated, an overview window may be generated for each of the running applications and the overview windows may be arranged for display in an overview overlay including multiple overview spaces on the graphical user interface of the computing device.

In response to the first user selection in block 1120, the computing device determines whether one or more applications are running in a windowed mode or a full-screen mode. In block 1130, when the one or more applications are running in the windowed mode, the computing device generates a first (windowed) overview window for each of the applications running in the windowed mode.

In block 1140, the computing device may provide the one or more first overview windows in a flat arrangement. For example, the first overview windows may be arranged in multiple rows and in a most recently used order from left to right, as well as top to bottom. In block 1150, the computer device then provides for display, in the overview mode, the first overview windows in a first (windowed) overview space.

In block 1160, when there are one or more applications running in the full-screen mode, the computing device may generate a second (full-screen) overview window for each of the applications running in the full-screen mode. In some implementations, each of the first overview windows is generated by resizing the corresponding application window to a unit height while maintaining the same aspect ratio, while the second overview windows may have the same size.

In block 1170, the computing device may provide the one or more second overview windows in a stacked arrangement. The second overview windows may be arranged in a card stack with the most recently used full-screen application on the top of the stack. The computer device then provides for display, in the overview mode, the second overview windows in a second (full-screen) overview space in block 1180.

Many of the above-described example processes 1000 and 1100, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, multiple software aspects of the subject disclosure may be implemented as sub-parts of a larger program while remaining distinct software aspects of the subject disclosure. In some implementations, multiple software aspects are implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 12:
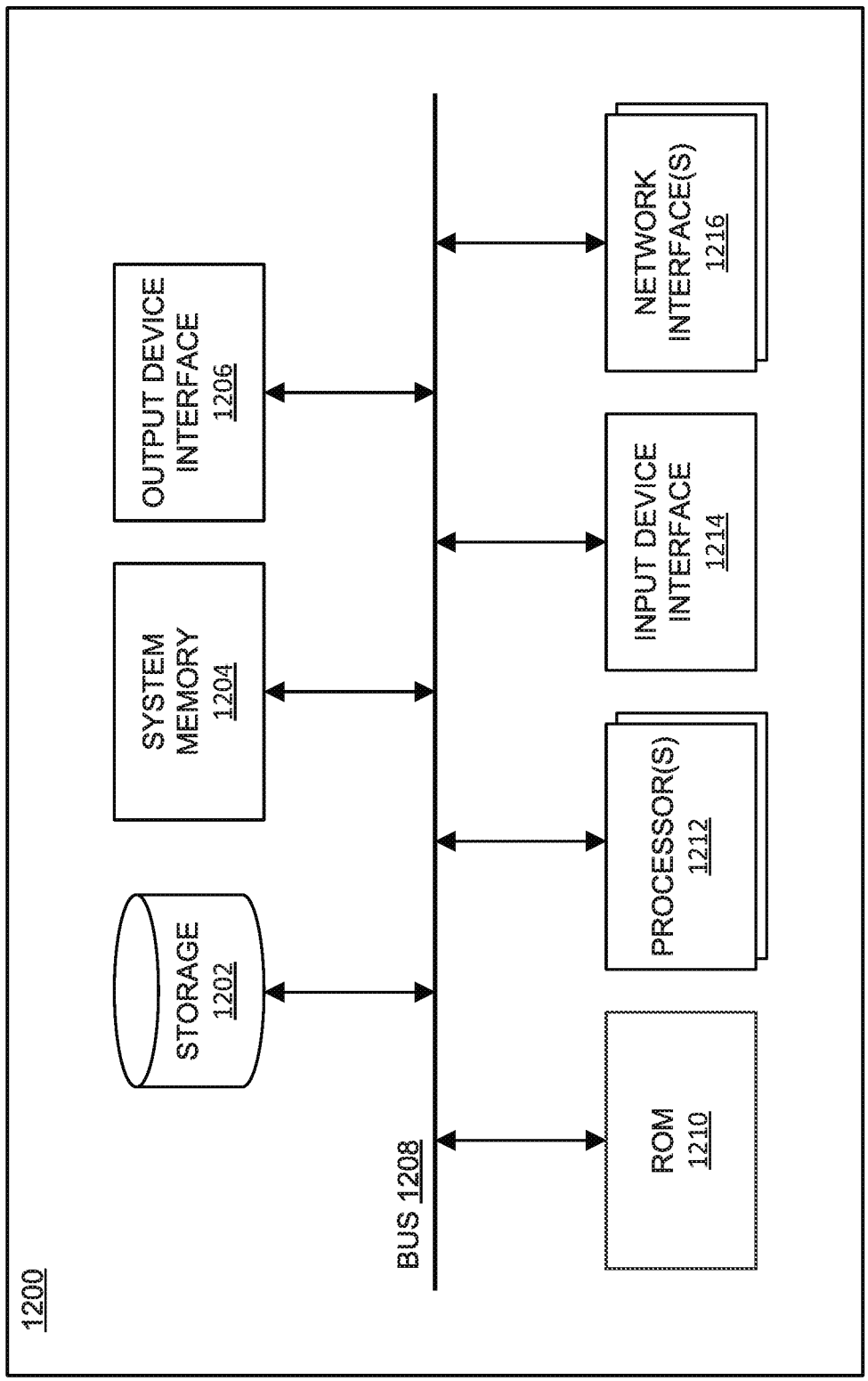
FIG. 12 is a diagram illustrating an example computing device for use in connection with displaying an overview mode, in accordance with aspects of the subject technology.

FIG. 12 is a diagram illustrating an example computing device 1200 for use in connection with displaying an overview mode, in accordance with aspects of the subject technology. Computing device 1200 may be a computing device for execution of software associated with one or more portions or steps of processes 1000 and 1100, or components and processes provided by FIGS. 1-11. Computing device1200 may be representative of the computing device described above. In this regard, computing device1200 may be a personal computer or a mobile device such as a smartphone, tablet computer, laptop, PDA, or other touch screen or television with one or more processors embedded therein or coupled thereto, or any other sort of computer-related electronic device having network connectivity.

Computing device 1200 may include various types of computer readable media and interfaces for various other types of computer readable media. In the depicted example, computing device1200 includes a bus 1208, processing unit(s) 1212, a system memory 1204, a read-only memory (ROM) 1210, a permanent storage device 1202, an input device interface 1214, an output device interface 1206, and one or more network interfaces 1216. In some implementations, computing device 1200 includes or is integrated with other computing devices or circuitry for operation of the various components and processes previously described.

Bus 1208 collectively represents all system, peripheral, and chipset buses that communicatively connect the numerous internal devices of computing device1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of the electronic system. Permanent storage device 1202, on the other hand, is a read-and-write memory device. This device is a non-volatile memory unit that stores instructions and data even when computing device 1200 is off. Some implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. From these various memory units, processing unit(s) 1212 retrieves instructions to execute and data to process in order to execute the processes of some implementations.

Bus 1208 also connects to input and output device interfaces 1214 and 1206. Input device interface 1214 enables the user to communicate information and select commands to the electronic system. Input devices used with input device interface 1214 include, e.g., alphanumeric keyboards and pointing devices (also called "cursor control devices"). Output device interfaces 1206 enables, e.g., the display of images generated by the computing device1200. Output devices used with output device interface 1206 include, e.g., printers and display devices, such as cathode ray tubes (CRT) or liquid crystal displays (LCD). Some implementations include devices such as a touchscreen that functions as both input and output devices.

Finally, as shown in FIG. 12, bus 1208 also couples computing device 1200 to a network (not shown) through network interfaces 1216. Network interfaces 1216 may include, e.g., a wireless access point (e.g., Bluetooth or WiFi) or radio circuitry for connecting to a wireless access point. Network interfaces 1216 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of computing device1200 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD−RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
   receiving, by a computing device, a user selection of a user interface element corresponding to an overview mode of the computing device;
   responsive to receiving the user selection, determining, by the computing device, whether one or more application from a plurality of applications executing at the computing device are running in a windowed mode or a full-screen mode;
   responsive to determining that a first portion of the plurality of applications is running in the windowed mode:
      generating, by the computing device, a first overview window for each application from the first portion of the plurality of applications; and
      outputting, for display, an overview mode graphical user interface including the first overview windows in a first overview space; and
   responsive to determining that a second portion of the plurality of applications are running in the full-screen mode:
      generating, by the computing device, a second overview window for each application from the second portion of the plurality of applications; and
      outputting, for display, the overview mode graphical user interface including the second overview windows in a second overview space.

2. The method of claim 1, wherein the first overview windows in the first overview space are arranged in a most recently used order in one or more rows, each of the first overview windows having a normalized height and a same aspect ratio as its corresponding application running in the windowed mode.

3. The method of claim 1, wherein the second overview windows in the second overview space are arranged in a most recently used order.

4. The method of claim 1, further comprising:
   receiving, by the computing device, a user input to move a particular second overview window from the second overview space to the first overview space; and
   responsive to receiving the user input to move the particular second overview window, moving the particular second overview window from the second overview space to the first overview space.

5. The method of claim 4, wherein, after moving of the particular second overview window from the second overview space to the first overview space, an application corresponding to the particular second overview window transitions from running in the full-screen mode to running in the windowed mode.

6. The method of claim 1, further comprising:
   receiving, by the computing device, a user input to activate an application corresponding to a selected overview window; and
   responsive to receiving the user input to activate the application:
      exiting the overview mode; and
      activating the application corresponding to the selected overview window.

7. The method of claim 1, further comprising:
   determining a height and a width of an overview area on a display of the computing device;
   determining a total available relative width as a function of a given number of rows based on the height and the width of the overview area;
   calculating a sum of relative widths of the first portion of the plurality of applications that are running in the windowed mode by normalizing each of the first portion of the plurality of applications that are running in the windowed mode to a unit height while maintaining its original aspect ratio;
   determining a number of rows based on the calculated sum of relative widths and the total available relative width; and
   arranging the first overview windows with a normalized height in the number of rows.

8. The method of claim 7, wherein arranging the first overview windows in the number of rows comprises determining one or more split points in between rows of the first overview windows such that the first overview windows are evenly distributed among each row.

9. The method of claim 1, wherein the user interface element corresponding to an overview mode is an overview button.

10. A non-transitory machine-readable medium encoded with instructions that, when executed by one or more processors of a computing device, cause the one or more processors to:
   receive a user selection of a user interface element corresponding to an overview mode of the computing device;
   responsive to receiving the user selection, determine whether one or more application from a plurality of applications executing at the computing device are running in a windowed mode or a full-screen mode;
   responsive to determining that a first portion of the plurality of applications are running in the windowed mode:
      generate a first overview window for each application from of the first portion of the plurality of applications; and
      output, for display, an overview mode graphical user interface including the first overview windows in a first overview space; and
   responsive to determining that a second portion of the plurality of applications are running in the full-screen mode:
      generate a second overview window for each application from the second portion of the plurality of applications; and output, for display, the overview mode graphical user interface including the second overview windows in a second overview space.

11. The non-transitory machine-readable medium of claim 10, wherein the instructions further cause the one or more processors to:
receive a user input to move a particular second overview window from the second overview space from the second overview space to the first overview space; and
responsive to receiving the user input to move the particular second overview window, move the particular second overview window from the second overview space to the first overview space.

12. The non-transitory machine-readable medium of claim 10, wherein the instructions further cause the one or more processors to:
receive a user input to activate an application corresponding to a selected overview window; and
responsive to receiving the user input to activate the application:
exit the overview mode; and
activate the application corresponding to the selected overview window.

13. The non-transitory machine-readable medium of claim 10, wherein the instructions further cause the one or more processors to:
determine a height and a width of an overview area on a display of the computing device;
determine a total available relative width as a function of a given number of rows based on the height and the width of the overview area;
calculate a sum of relative widths of the first portion of the plurality of applications that are running in the windowed mode by normalizing each of the first portion of the plurality of applications that are running in the windowed mode to a unit height while maintaining its original aspect ratio;
determine a number of rows based on the calculated sum of relative widths and the total available relative width; and
arrange the first overview windows with a normalized height in the number of rows.

14. The non-transitory machine-readable medium of claim 13, wherein the instructions further cause the one or more processors to arrange the one or more first overview windows in the number of rows further comprise instructions that cause the one or more processors to determine one or more split points in between rows of the one or more first overview windows such that the one or more first overview windows are evenly distributed among each row.

15. The non-transitory machine-readable medium of claim 13, wherein the user interface element corresponding to an overview mode is an overview button.

16. A computing device, comprising:
one or more processors;
a display device; and
a memory storing instructions that, when executed by the one or more processors, cause the one or more processors to:
receive a user selection of a user interface element corresponding to an overview mode of the computing device;
responsive to receiving the user selection, determine whether one or more application from a plurality of applications executing at the computing device are running in a windowed mode or a full-screen mode;
responsive to determining that a first portion of the plurality of applications are running in the windowed mode:
generate a first overview window for each application from of the first portion of the plurality of applications; and
output, for display by the display device, an overview mode graphical user interface including the first overview windows in a first overview space; and
responsive to determining that a second portion of the plurality of applications are running in the full-screen mode:
generate a second overview window for each application from the second portion of the plurality of applications; and
output, for display by the display device, the overview mode graphical user interface including the second overview windows in a second overview space.

17. The computing device of claim 16, wherein the instructions further cause the one or more processors to:
receive a user input to move a particular second overview window from the second overview space from the second overview space to the first overview space; and
responsive to receiving the user input to move the particular second overview window, move the particular second overview window from the second overview space to the first overview space, wherein, after moving of the particular second overview window from the second overview space to the first overview space, an application corresponding to the particular second overview window transitions from running in the full-screen mode to running in the windowed mode.

18. The computing device of claim 16, wherein the instructions further cause the one or more processors to:
receive a user input to activate an application corresponding to a selected overview window; and
responsive to receiving the user input to activate the application:
exit the overview mode; and
activate the application corresponding to the selected overview window.

19. The computing device of claim 16, wherein the instructions further cause the one or more processors to:
determine a height and a width of an overview area on a display of the computing device;
determine a total available relative width as a function of a given number of rows based on the height and the width of the overview area;
calculate a sum of relative widths of the first portion of the plurality of applications that are running in the windowed mode by normalizing each of the first portion of the plurality of applications that are running in the windowed mode to a unit height while maintaining its original aspect ratio;
determine a number of rows based on the calculated sum of relative widths and the total available relative width; and
arrange the first overview windows with a normalized height in the number of rows.

20. The computing device of claim 19, wherein the instructions further cause the one or more processors to arrange the one or more first overview windows in the number of rows further comprise instructions that cause the one or more processors to determine one or more split points in between rows of the one or more first overview windows such that the one or more first overview windows are evenly distributed among each row.

* * * * *